Oct. 14, 1952  F. L. MOORE  2,613,939
SOUND RECORDING AND REPRODUCING MACHINE
Filed Feb. 4, 1946  8 Sheets-Sheet 1

INVENTOR
*Frank L. Moore*
BY
*Darby & Darby*
ATTORNEYS.

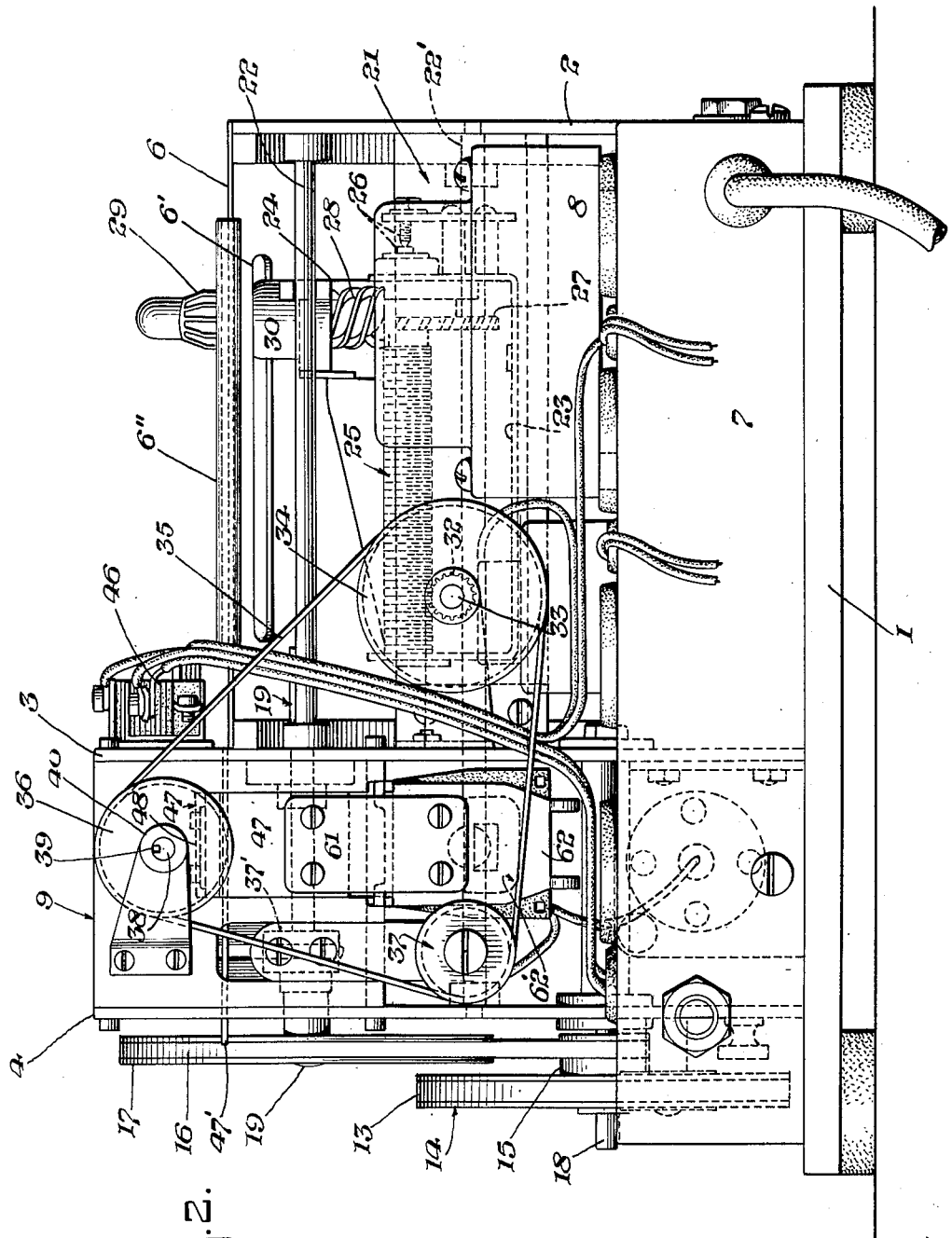

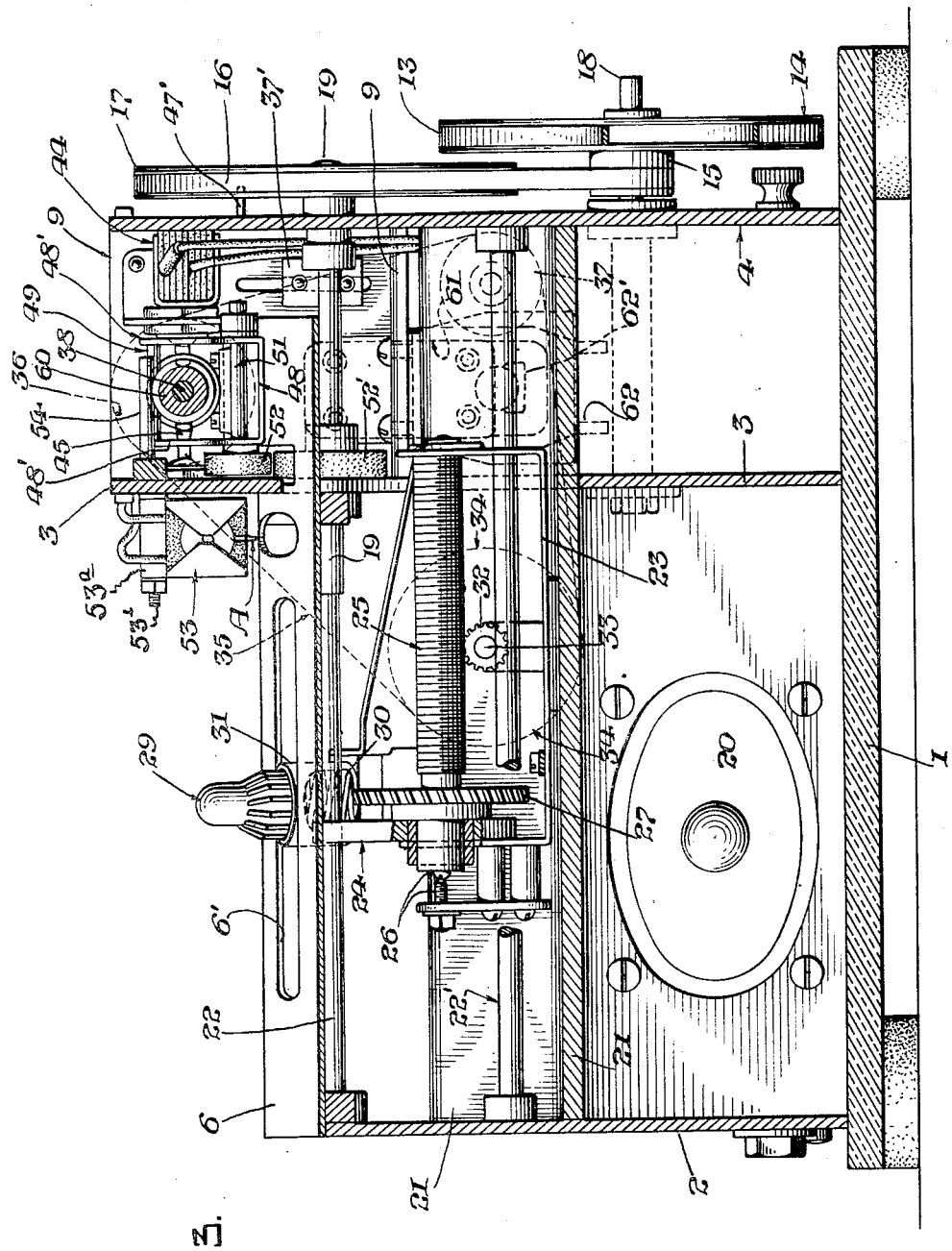

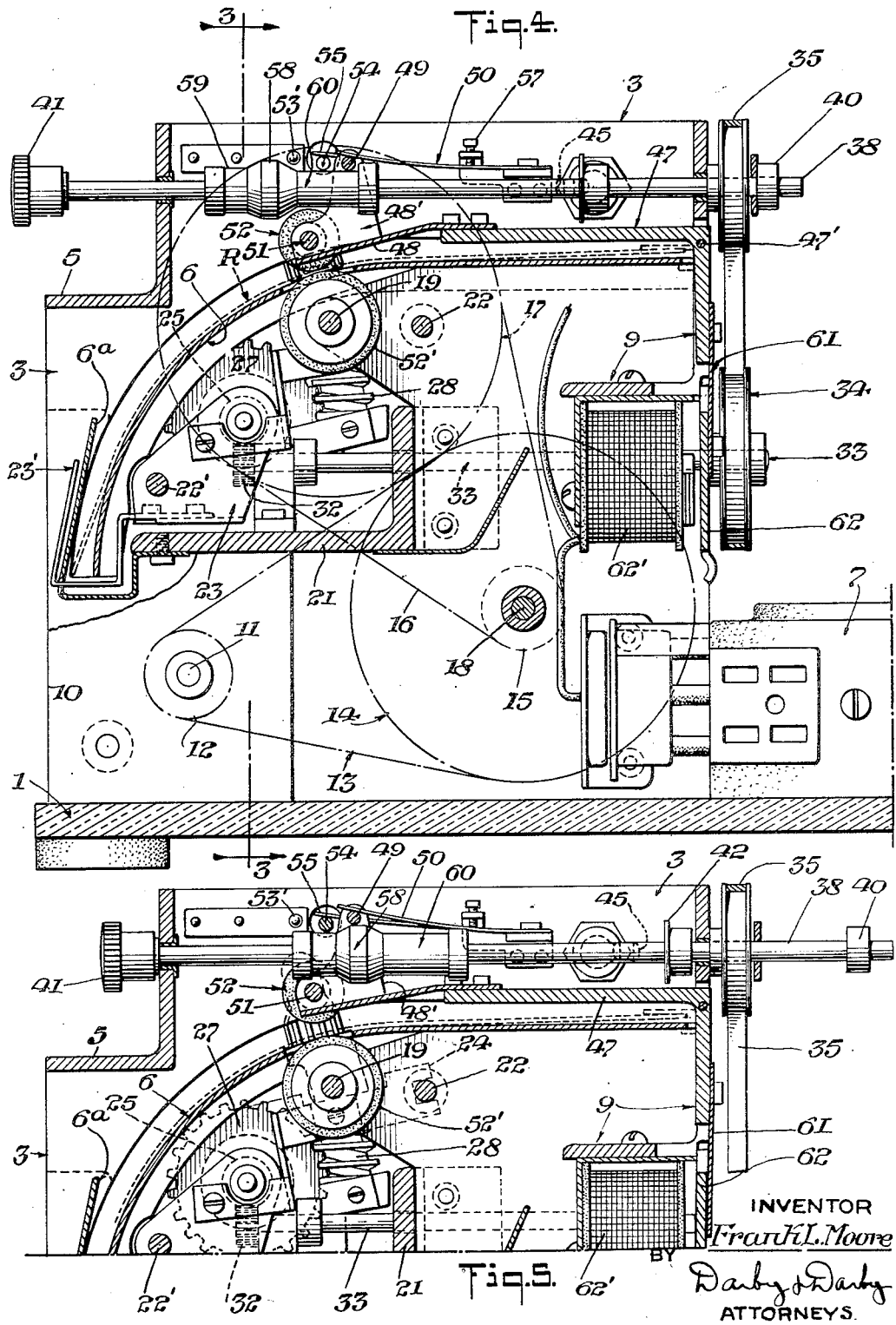

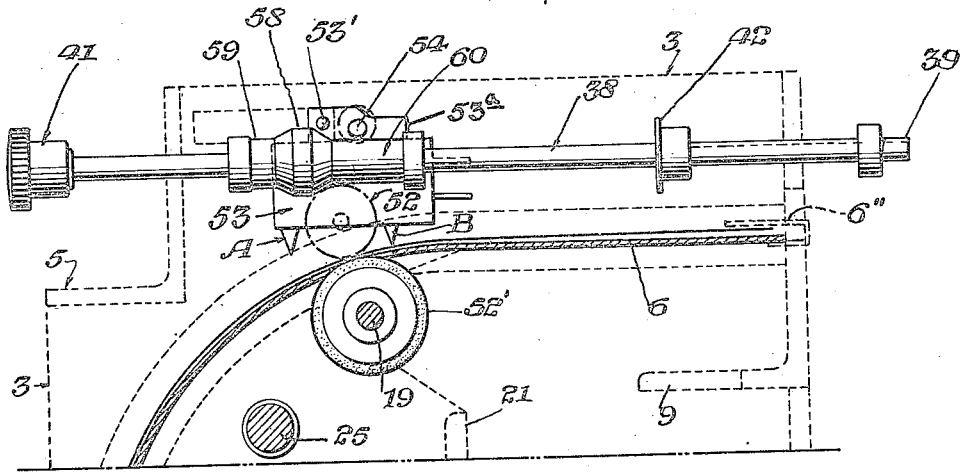
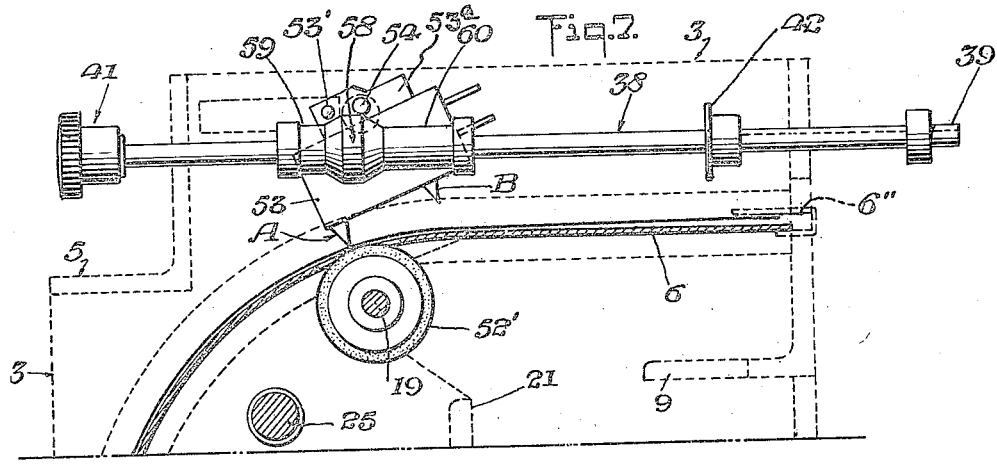
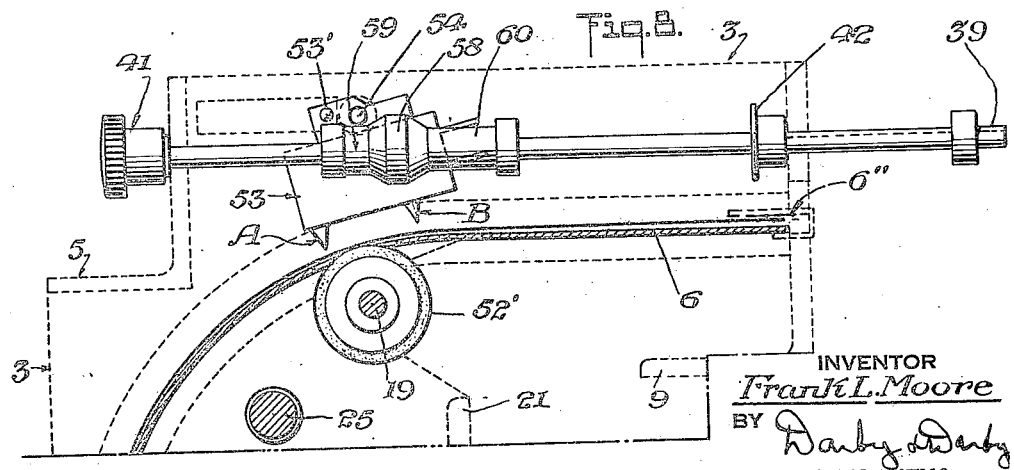

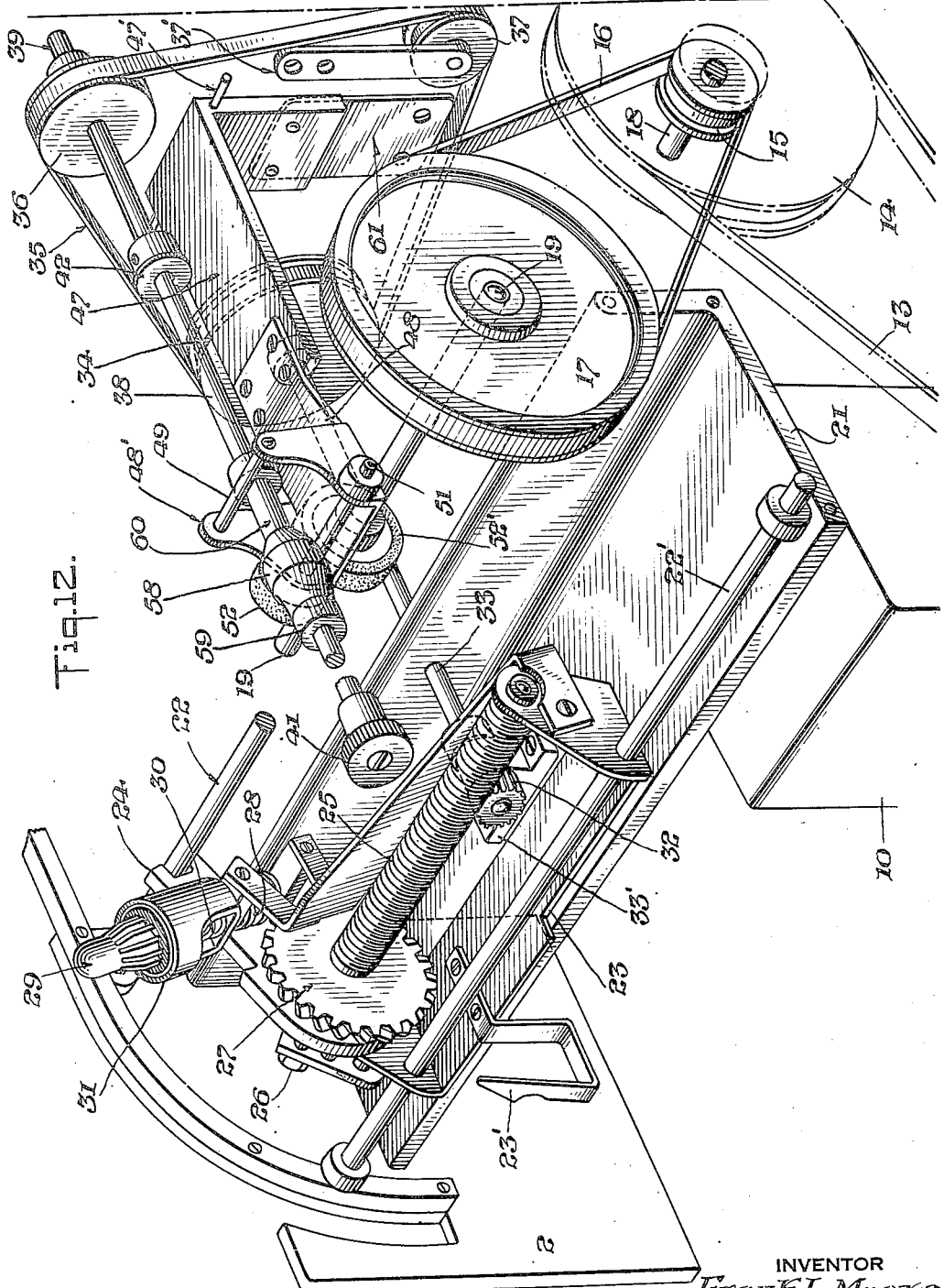

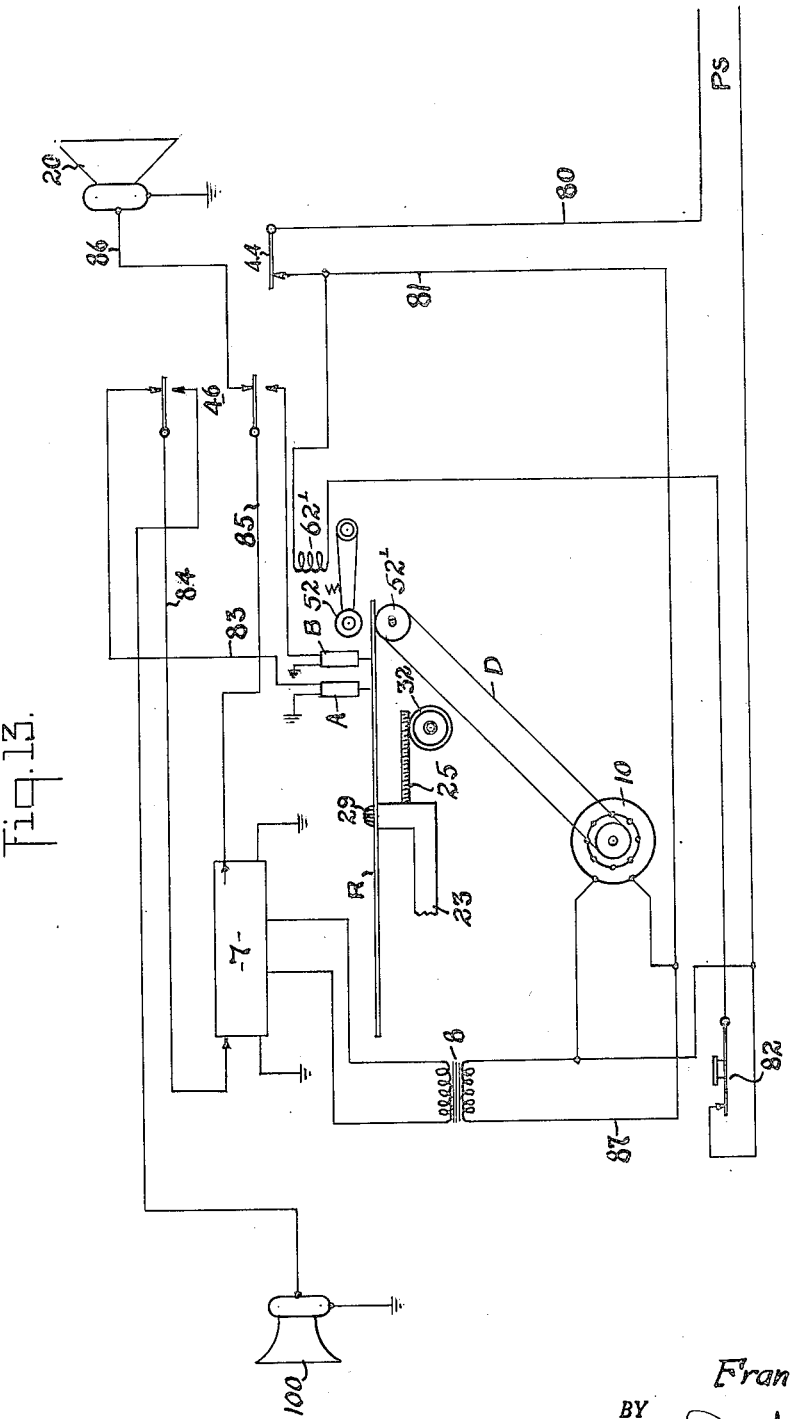

Patented Oct. 14, 1952

2,613,939

UNITED STATES PATENT OFFICE 2,613,939

SOUND RECORDING AND REPRODUCING MACHINE

Frank L. Moore, Hartford, Conn., assignor to The Gray Manufacturing Company, Hartford, Conn., a corporation of Connecticut Application February 4, 1946, Serial No. 645,377

10 Claims. (Cl. 274—12)

This invention relates to improvements in sound recording and reproducing machine as used for the recording and transcription of dictation with special reference to control features thereof.

A broad object of this invention is to provide in a sound recording and reproducing machine a novel form of control mechanism for conditioning the machine for recording or reproduction and back and forward spacing.

Within the object it is an object of this invention to provide a single control means for effecting these conditions.

Another object of this invention is to provide in association with such a combination an additional control by means of which the motion of the record can be started and stopped from a point at or remote with respect to the machine.

A more specific object of this invention is to provide a manual control having three positions, in the first of which the machine is completely static; in the second of which its operating motor is energized and the reproducing head engages the record blank; and in the third of which the operating motor is still energized and the recording head is in engagement with the record blank.

A companion object of this invention is to provide a separate control for starting and stopping the relative movement of the record blank with respect to the recording and reproducing heads while the operating motor remains energized.

Other and more detailed objects of this invention will be apparent from the following description of the embodiment thereof shown in the attached drawings for illustrative purposes.

This invention resides substantially in the combination, construction, arrangement and relative location of parts, all as will be described in detail below.

In the accompanying drawings,

Figure 2 is a rear elevational view of the machine as shown in Figure 1;

Figure 3 is a cross-sectional view taken on the line 3—3 of Figure 4;

Figure 4 is a cross-sectional view taken on the line 4—4 of Figure 1 showing the control manual in full forward position which is the recording position;

Figure 5 is the upper portion of Figure 4, showing the control manual in full off position;

Figures 6, 7 and 8 are somewhat diagrammatic views showing the three positions of the control manual and its effect on the recording and reproducing head;

Figure 12 is a perspective view of the same vital parts of the mechanism showing particularly the drive and back spacing structural features; and Figure 13 is a diagrammatic and schematic view of the circuit connections for the machine.

Figure 1:
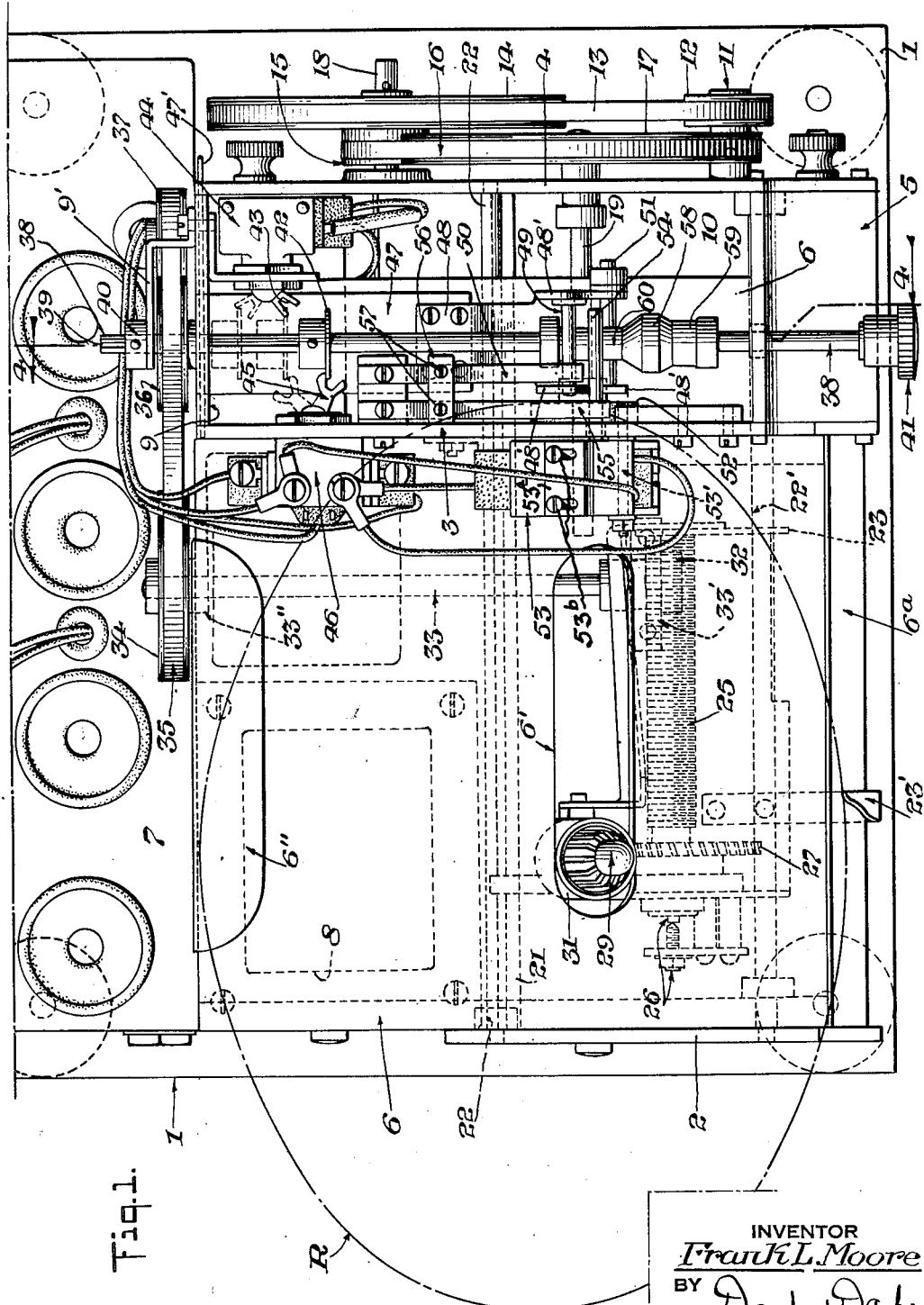
Figure 1 is a top plan view of a sound recording and reproducing machine in which are incorporated the features of this invention, in which figure the outer decorative housing is removed.
Figure 9:
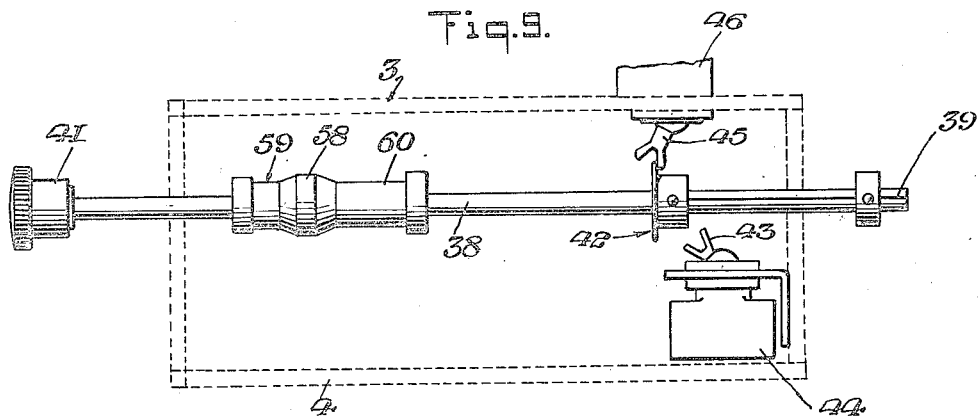
Figures 9, 10 and 11 are diagrammatic views showing the same three positions of the control manual and its effect on the switches operated thereby.
Figure 10:
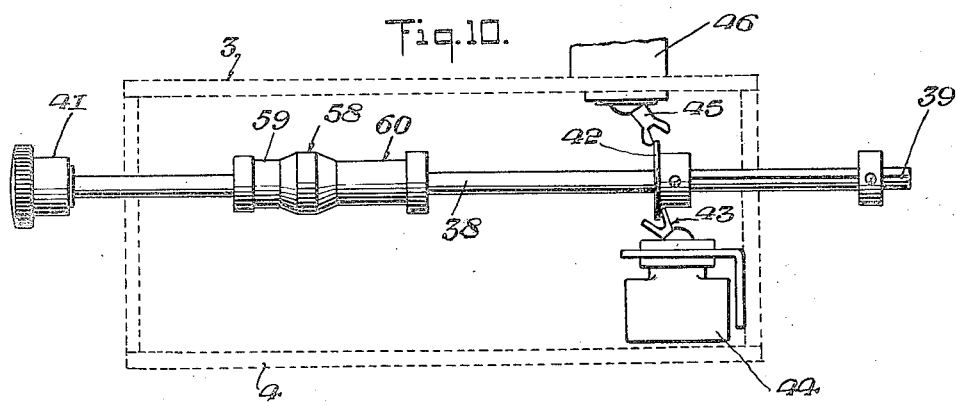
Figure 11:
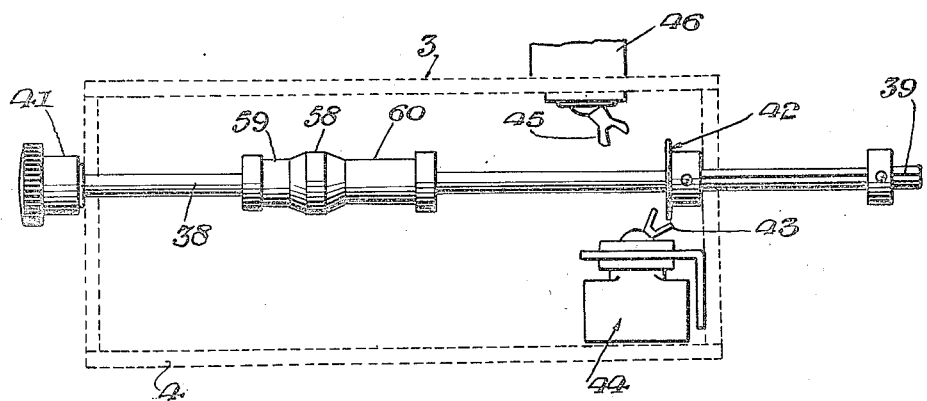

Before referring to the novel features, functions and operation of the mechanism of the drawings it will be described with reference to its structure. As shown the machine has a base 1 of any suitable material supported on cushioning feet and which in turn supports a plurality of plate or frame members upon which the various parts of the mechanism are mounted. Thus, as will be seen from Figures 1, 2 and 3, the frame members comprise an end plate 2, an intermediate plate 3, and another end plate 4. The plates 3 and 4 are connected at the front by an L-shaped bracing member 5 (see particularly Fig. 4) and at the rear by a plate 9 (see Fig. 2). The plates 2, 3 and 4 are connected by a heavy L-shaped bracing member 21 which appears best in Figures 3 and 12. The end plate 2 is curved at its upper end and the plate 3 is provided with a curved slot (see Fig. 4) on which is secured a curved cover plate 6 having a longitudinal slot 6' thereon. The cover 6 projects through the slot in the plate 3, but stops short of plate 4, as will be seen in Figure 1. Mounted on the base plate 1 in back of these frame members, and diagrammatically illustrated, is a vacuum tube amplifier 7 to which no special further reference will be made in view of the fact that the details of such amplifiers are well known in the electronic arts and may vary functionally and structurally as conditions require. The power transformer to which no special reference will be made appears at 8 and is mounted upon the top of the amplifier 7. At this point the loud speaker 20 (see Fig. 3) may be referred to generally since it likewise forms no part of this invention. As is clear from Figure 3, the loud speaker is mounted between plates 2 and 3 and under the bracing member 6. Likewise a motor 10 which forms by itself no part of this invention is mounted at the front of the machine between the plates 3 and 4 under the brace 5, as will be seen in Figure 4.

The shaft 11 of the motor is provided with a drive pulley 12 which is connected by a belt 13 to a larger drive pulley 14 secured to the shaft 18. The shaft 18 is a short shaft journaled in the plates 3 and 4. On the shaft 18 is a smaller pulley 15 connected by a belt 16 to another large pulley 17 mounted on the shaft 19. Shaft 19 is likewise a short shaft journaled in the plates 3 and 4 (see Fig. 3).

A pair of guide rods 22 and 22' (see Figs. 3 and 12) are mounted between the end plates 2 and 4. Slidably mounted on the guide rod 22' is a frame or carriage 23 having secured at one end a guide bar 24 which is slotted to have a sliding fit on the guide rod 22 (see Fig. 12). A threaded shaft 25 is rotatably mounted on the carriage 23 and is engaged at one end by an adjustable anti-friction end thrust ball 26 (see also Fig. 3) so as to hold the threaded shaft against endwise movement on the carriage. Secured to the threaded shaft 25 is a worm wheel 27 which meshes with a worm 28 secured to the record receiving spindle 29 journaled on the carriage 23. The spindle 29 is made in two parts which are connected for axial sliding movement and a spring 30 normally holds these parts in extended relation. The upper end of the shaft 29 is fluted, as shown, to provide means for locking thereon a record blank which has a central serrated opening to key it to this member for conjoint rotation therewith. The spring 30 is enclosed within a circular housing 31 into which the fluted member of the shaft 29 can be pushed to a point below the plane of the record blank. Thus the record blank can be released by simply pressing the fluted end of the shaft 29 downwardly into the sleeve housing 31 to disengage its teeth from the serrations of the record disc.

The forward end of a shaft 33 is journaled in a bracket 33' (see Fig. 12) mounted on the brace 21 and is journaled at the other end in a bracket 33'' at the rear (see Fig. 1). The forward end of the shaft 33 is provided with a worm gear 32 which meshes with the threads of the threaded shaft 25 which acts as a worm.

Going back in the description for a moment the cover plate 6 (see Fig. 1) is provided with a guide 6'' at its rear edge under which the record blank is guided and at the front of the brace 21 is a guide plate 6a (see Fig. 4) which guides the other edge of the record blank. The record blank which is indicated at R in Figure 4 is of thin flexible material such as cellulose acetate and the guides 6 and 6a cause it to assume a generally arcuate form so as to take the general shape of the cover 6. Secured to the carriage 23 is a pointer 23' which serves to indicate exteriorly of the machine the relative position of the carriage 23 and hence a record blank R on the spindle thereof with respect to the recording and reproducing head.

Secured to the rear end of shaft 33 is a pulley 34 which is connected by a belt 35 with pulleys 36 and 37. Pulley 37 is rotatably mounted on a bar 37' adjustably mounted on the rear plate 9 (see Fig. 2). Pulley 36 is secured to the rear end of the rod 38 forming part of the manual control and on the forward end of the rod 38 is the operating knob 41. By vertically adjusting the bar 37' the tension on the belt 35 can be properly adjusted. A collar 40 is secured to the rear end of shaft 38 to limit its forward movement while the knob 41 limits its rearward movement. Pulley 36 (see Fig. 1) is held between the rear plate 9 and a bracket 9' and is connected to the shaft 38 by a spline which operates in the groove 39 of shaft 38. Thus the rod 38 may move longitudinally back and forth through the pulley 36, although that pulley is connected thereto for rotation with it. Rod 38 is provided with a flanged collar 42 which cooperates with the operating arms 43 and 45 of the switches 44 and 46 respectively. Switch 44 is the main power on and off switch and will be referred to in connection with Figure 13. Switch 46 likewise referred to later controls the amplifier 7.

Pivotally mounted in the rear plate 9 is an L-shaped lever 47 (see particularly Fig. 12) and is mounted thereon by the pivot pin 47'. Secured to the forward end of the lever is an extension 48 having integral side members 48' between which extend the rod 49 and the rotatable shaft 51. A flexible leaf spring 50 is connected to a bracket mounted on the side plate 3 and bears on the rod 49. Secured to the shaft 51 is a friction idler roller 52. Mounted under this roller and secured to the power driven shaft 19 (see Fig. 12) is the friction driving roller 52'. As can be seen from Figs. 3 and 4 the record blank lies between these two friction rollers, and as will be explained later is driven by them.

Pivotally mounted on the plate 3, as indicated at 53' (see Fig. 6), is the combined recording and reproducing head having the styli B and A respectively. The pivot pin 53' and a pin 54 are mounted in a block 53a (see Figs. 1 and 7), which is secured to the recording and reproducing head 53 by means of slots and screws 53b. Thus it will be seen that the block 53a can be secured on top of the unit in various adjusted positions forwardly and backwardly of the unit. As the record blank R is moved over the curved surface of the supporting plate 6 it will be seen that if, as is shown in Figure 7, the unit 53 is pivotally supported above the curved surface, by moving the unit to the left or right (Fig. 7) with the fixed pivotal support 53', that the pressure with which the stylus A or B engages the record can be varied. Thus by loosening the screws 53b and positioning the unit 53 forwardly or backwardly the depth to which the recording stylus B will cut can be varied since it engages the record blank in the region of curvature. As will be shortly explained, the pin 54 cooperates with a camming surface in a manner so that operation of the manual 41, after adjustment of the unit 53 as previously described, will effect return of the styli to the proper relative predetermined positions with regard to the record blank on each operation. Bearing on this pin is a flexible leaf spring 55 (see Fig. 1). This leaf spring is connected as shown to the support of the leaf spring 50. The tension in the leaf springs 50 and 55 can be independently adjusted by means of the screws 57.

Mounted upon the shaft 38 is a cam member having three cylindrical camming surfaces 58, 59 and 60, see Fig. 7. The surface 58 lies between the other two and is approached by means of conical surfaces, as is clear from various of the figures. These camming surfaces cooperate with the rod 49 and the pin 54 in a manner to be described later.

Secured to the depending end of the pivotally mounted L-shaped lever 47 is an extension 61 on the end of which is secured a magnetic armature 62. This armature cooperates with an electromagnet 62' (see Fig. 4).

Reference will now be made to Figure 13 wherein the power supply leads for the machine are shown at PS, one of which is connected by wire 80 to switch 44 and the other of which connects to normally closed "on" and "off" switch 82. The other terminal of switch 82 is connected to one terminal of coil 62' having its other terminal connected to wire 81, which in turn is connected to switch 44. Wire 81 is also connected to one terminal of the motor 10 and by wire 87 to one terminal of the primary of transformer 8. The other terminal of this primary is connected to the remaining terminal of motor 10 and to one lead of the power supply PS, as shown. The secondary of transformer 8 supplies operating current and potentials to the amplifier 7. Motor 10 is connected through drive connection D to the drive roller 52'. It will be understood that the drive connection D is represented by the various pulleys and belts 12, 13, 14, 15, 16 and 17. The reproducing portion of the head having the stylus A is connected to one terminal of the amplifier switch 46 which structurally is a double-pole double-throw switch.

At this point it may be noted that the recording and reproducing head unit can take many forms, as for example it may be of the electromagnetic, electro-static, or piezoelectric crystal types, all of which are well understood in the art. The upper movable blade of switch 46 is connected by wire 84 to the input side of the grounded amplifier 7. The output of the amplifier 7 is connected by wire 85 to the lower movable contact of the amplifier switch 46. The grounded microphone 100 is connected to the other contact cooperating with the upper switch blade of switch 46. The upper contact cooperating with the lower blade of switch 46 is connected by wire 86 to the grounded loud speaker 20. The remaining contact of switch 46 is connected to the recording head or portion of the recording reproducing unit as indicated by its connection to the stylus B. As will be explained later, the magnet 62' effects the movement of the idler wheel 52 into and out of engagement with the upper face of the record R at a point opposite to its point of contact with the driving roller 52'.

A description of the operation of this machine will now be given.

In order to condition the machine for recording the spindle 29 and connected parts are moved to the extreme left hand position, the manual 41 being pushed fully to the rear, in which position the combined recording and reproducing head is in a central position so that neither stylus A nor B B is in a position to engage the record blank. This central position of the recorder-reproducer head is insured by the movement of the cam surface 59 under the pin 54, causing the unit to rotate to a central position, see Fig. 7. At the same time the portion 58 of the cam moves under the rod 49, causing lever 47 and the connected parts to move upwardly, thus raising the idler friction roller 52 which is rotatably mounted on the end thereof. At this time, of course, the main power switch 44 is open and the two blades of the amplifier switch 46 engage the uppermost contacts (see Fig. 13). The carriage 23 and connected parts can be moved to the left by rotating the manual 41 in a counterclockwise direction until the carriage is in full outermost position. The structure is such that the carriage can as easily be moved to this outermost position by simply grasping the spindle 29 and pushing it to the left.

The machine is now ready to receive a record blank which in the case of a recording will be a fresh unused blank. This blank is applied to the spindle 29 by impaling it thereon to which it is locked by having a serrated central opening mesh with the serrated cylindrical surface of the spindle 29. The carriage and connected parts are then moved back to the extreme right hand position, by rotating manual 41 in a clockwise direction or simply pushing on the spindle 29. As the record blank is thin and flexible its front edge rides under the guide 6ª and its rear edge rides under the guide 6'', see Figure 1, for example.

Assuming that the apparatus is connected to a suitable power source such as the usual lighting circuit through the leads PS, current will be on the primary of transformer 8, when manual 41 is pulled all the way forward, causing switch 44 to close by reason of the engagement of the flange collar 42 with the operating member 43 of that switch. Switch 46 is also operated from the position shown in Figure 13 by the engagement of the flange collar 42 with the operating member 45 of that switch, so that the two movable blades thereof disengage the upper fixed contacts and engage the lower fixed contacts. The closing of switch 44 completes a circuit for motor 10 through wire 80, switch 44, wire 81 and motor 10 to the other side of PS. Thus the motor is energized, causing the rotation of the lower friction drive wheel 52'. As the manual 41 moves to forward position the pin 54 is allowed to drop down onto the cam surface 60, which permits the recorder-reproducer unit 53 to rotate in a direction so that the recording stylus B engages the record blank R at a beginning point for recording which is on a minimum radius with respect to the spindle 29. Also, the rod 49 drops down onto cam 60, so that lever 49 is free to pivot in a counterclockwise direction (Fig. 12) to carry the idler friction roller 52 down into engagement with the upper surface of the record blank R at a point above the drive roller 52', under the action of leaf spring 50. It may be noted here that leaf spring 50 bearing on the pin 54 holds the unit 53 in recording position. For emphasis it is to be noted that spring 50 holding the pin 54 against the camming surface 60 determines the proper position of the styli of the recorder-reproducer unit, predetermined of course by the adjustment of the unit with respect to the block 53ª mounted on a fixed pivot pin.

The release of the lever 47, however, does not result in idler roller 52 dropping into engagement with the record blank R because magnet 62' is energized from wire 81 through switch 82 which is normally closed and is at the microphone station. Thus, although motor 10 is operating, the record blank is not in motion. In order to put it in motion the operator presses a button to open switch 82 which de-energizes the magnet 62' with the result that under the action of leaf spring 50 lever 47 rotates in a counterclockwise direction moving the idler roller 52 into engagement with the upper surface of the record blank R under pressure. Since the record blank is now gripped between the rollers 52 and 52', the latter of which is rotating, and as these rollers are provided with friction surfaces, as for example rubber, the record blank R will be caused to rotate.

As the record blank rotates it causes spindle 29 to revolve through its keyed connection therewith and thus worm 28 revolves. The rotation of worm 28 causes worm wheel 27 to rotate and with it threaded shaft 25. The reaction of threaded shaft 25, on the relatively fixed worm wheel 32, causes the carriage 23 and connected parts to move slowly to the left. Thus as the record blank rotates it is translated slowly in a radial direction, with the result that the recording stylus B will form a spiral path of gradually increasing radius. At this point it may be noted that the various connections to the shaft 33 introduce enough frictional resistance to the rotation thereof so as to form a fixed reaction member against which the slowly revolving threaded shaft 25 reacts to drive the carriage and connected parts as explained.

In order to record sounds on the record, the dictator speaks into the microphone 100 sending a current from ground through the wire connected to the microphone to the lower contact of the upper pair in the switch 46. From there the current flows through the upper movable contact of the switch through wire 84 to amplifier 7 which is energized from wire 81 through wire 87. The amplified output of the amplifier 7 is applied through the wire 85, movable lower contact of switch 46 and the wire thereto to the grounded operating coil for the recording portion of the unit 53. Thus the recording stylus is set into vibration to impress upon the record blank R a record corresponding to the sounds applied to the microphone 100.

The dictator may interrupt his dictation at any time and cause the record blank R to stop by simply closing switch 82 to thereby energize the magnet 62, causing it to attract its armature 62 and impart clockwise rotation to lever 47 (see Fig. 4). This movement of the lever causes the idler friction roller 52 to move out of engagement with the upper surface of the record blank against the resistance of leaf spring 50. At the end of the pause the dictator again opens switch 82 and begins to speak into the microphone.

At this point it would be well to emphasize an important practical feature of this invention with regard to the magnet 62'. During recording this magnet is de-energized, or in other words it is only energized when the machine is not conditioned to record. The result is that disturbing feedback and other electro-magnetic disturbances do not reach the recording unit to mar the record being recorded thereon.

In order to reproduce with this machine the manual 41 is moved back to its intermediate position, at which time the pin 54 of the unit 53 rides up on the high point 58 of the cam on the shaft 38 so that the unit 53 is rotated so that its forward stylus A moves into engagement with the record blank and its rear stylus B is moved out of engagement therewith. In this position of the parts the bar 49 is still on the camming surface 60 so that the idler friction wheel 52 is free to move down into engagement with the record blank whenever magnet 62' is de-energized. Movement of the manual 41 to this position has operated switch 46 back to the position shown in Figure 13 without opening switch 44. Thus motor 10 continues to operate the drive roller 52'. In order to reproduce the record the dictator merely opens switch 82 to de-energize the magnet 62 so that as before the idler roller 52 is pressed into engagement with the record blank R, gripping it therefore between the two rollers 52 and 52'. The reproducing stylus A now engages the record in the record blank and converts the record thereon into electrical currents in a well understood manner, which are supplied through wire 82 to upper contact of the upper blade of switch 46 and wire 84 to the input of the amplifier 7. The output is fed from wire 85 through the lower movable contact of switch 46 to the upper contact of the lower pair, and by wire 46 to loud speaker 20, and thence to ground. Thus the recorded record is audibly reproduced by the loud speaker. The dictator may start and stop the machine as before by alternately opening and closing switch 82 to control the energization of magnet 62'.

During recording or reproduction the carriage 23 and connected parts, and hence the record blank on the spindle 29, can be back or forward spaced any desired amount by simply rotating the manual 41. The pressure of the reproducing stylus on the record blank is sufficiently light so that this back or forward spacing of the record blank can be accomplished even though reproducing stylus engages the record blank. The reproducing stylus in contact with the blank simply jumps across the grooves of the record blank. Preferably the operator will push the manual 41 all the way back and then back or forward space the record a desired amount by rotating this manual under which conditions neither of the styli engage the record blank. The splined sliding connection of the shaft 38 with the pulley 36 permits this operation. When forward spacing during recording a blank space is left on the record which is suitable for marking purposes to give instructions to the transcriber as by means of a legend or symbol such as the phrase "end of letter."

In order to put the machine entirely out of operation the operator merely moves the manual 41 all the way to the rear, opening switch 44, which completely de-energizes the machine.

In passing it may be noted that the pointer 23' connected to the carriage 23 moves over the front of the record guide 6ª on which may be provided, if desired, a holder for an index or marking sheet on which marks indicating end of dictation, correction, and other signals may be recorded for future reference during transcription.

From the above description it will be seen that an exceedingly compact combined sound recording and reproducing machine has been disclosed which is conditioned for non-operation, for recording, or for reproducing by the simple manipulation of a single manual which together with a simple manually operated switch at the dictator's station adapts the machine for all its functions. Those skilled in the art will readily appreciate many changes which may be made in the details of construction of the embodiment illustrated herein by way of example, and I do not, therefore, desire to be strictly limited to this embodiment as it is provided in an illustrative sense only. I prefer to be limited by the claims granted me.

What is claimed is:

1. In a sound recording and reproducing machine the combination comprising a relatively translatable recorder-reproducer unit and means for rotatably supporting a record, electric motor and transmission means for producing relative rotation and translation between said unit and means, a switch for energizing and deenergizing said motor, a single control member for actuating said switch and independently of said motor effecting relative translation of said unit and means, and motion transmitting elements interconnecting said member in actuating relationship with said switch and transmission.

2. In a sound recording and reproducing machine the combination comprising a movably supported recorder-reproducer unit, a rotatable record support, a radially movable carriage for said support, transmission means actuated by rotation of said support effecting radial movement of said carriage, driving means including an element engageable with a record when mounted on said support for effecting rotation thereof, a spring biasing said element towards said record, and control mechanism including a multi-position control member and mechanical gearing interconnecting said member with said driving means and unit respectively for energizing and deenergizing said driving means in cooperation with said spring, and actuating said unit to neutral, recording, and reproducing positions with respect to said record.

3. In the combination of claim 2, said driving means including a pair of friction rollers engageable with the record when mounted on said support, one of said rollers being directly driven, and a movable mounting for the other of said rollers, said control member being interconnected with said mounting through said gearing to shift one of said rollers relative to the record.

4. In the combination of claim 2, said driving means including a pair of friction rollers engageable with the record when mounted on said support, one of said rollers being directly driven, a movable mounting for the other of said rollers, said control member being interconnected with said mounting through said gearing locking said mounting in one position and releasing it in another, and electromagnetic means independently connected with said mounting positioning said movably mounted roller relative to said record.

5. In the combination of claim 2, said driving means including a pair of friction rollers engageable with the record when mounted on said support, one of said rollers being directly driven, a movable mounting for the other of said rollers, said control member being interconnected with said mounting through said gearing locking said mounting in one position and releasing it in another, normally energized electromagnetic means independently connected with said mounting for positioning said movably mounted roller in spaced relationship with respect to said record, and switching means deenergizing said electromagnetic means under recording and reproducing conditions.

6. In a sound recording and reproducing machine the combination comprising a recorder-reproducer unit movably mounted to assume neutral, recording and reproducing positions relative to a record, a carriage slidably supported for movement towards and away from said unit, a rotatable record support mounted on said carriage, transmission means effecting sliding movement of said carriage responsive to rotation of said record support, a pair of friction rollers engageable with opposite surfaces of a record mounted on said support, means driving one of said friction rollers, a movable mounting rotatably supporting the other of said rollers, a spring biasing said other roller towards said record, means including a manual control member and electromagnetic means interconnected with said mounting jointly controlling the position of said other roller relative to said record and gearing interconnecting said control member and transmission for moving said carriage with said control member independently of rotation of said record support.

7. In a sound recording and reproducing machine the combination comprising a movably mounted recorder-reproducer stylus carrying unit, a carriage slidable relative to said unit for rotatably supporting a record, driving means coacting with the record for effecting rotation thereof, transmission means interposed between said driving means and carriage for causing said carriage to slide as the record rotates, and a manual control interconnected with said unit for selectively positioning said unit relative to said carriage for recording and reproduction, said manual control being also interconnected with said transmission for effecting sliding movement of said carriage independently of said driving means.

8. In a sound recording and reproducing apparatus the combination comprising a recorder-reproducer unit, a slidable carriage for rotatably supporting a record including transmission means actuated by rotation of said record for causing said carriage to slide relative to said unit, driving means including a roller engageable with said record for effecting rotation thereof, a spring biasing said roller towards said record, a manual control member interconnected with said roller to shift it relative to said record and interconnected with said unit for selectively moving said unit into neutral, recording and reproducing positions, and roller shifting means remotely actuated independently of said control member for spacing said roller from said record.

9. In a sound recording and reproducing machine, a frame, a record carriage and a recorder-reproducer unit relatively movably supported by said frame, pivot means supporting said unit for movement in one path to neutral, recording and reproducing positions, guide means supporting said carriage for movement in a second path normal to the first, a control member movably carried by said frame and having two distinct motions with respect thereto, means interconnecting said member and unit transmitting one of said motions to said unit for movement in the first said path, and means interconnecting said member and carriage transmitting the other of said motions to said carriage for movement in the second said path.

10. In the combination of claim 8, said roller shifting means including an electromagnet for retracting said roller from said record in opposition to said biasing spring.

FRANK L. MOORE.

REFERENCES CITED

The following references are of record in the file of this patent:

UNITED STATES PATENTS

| Number | Name | Date |
| --- | --- | --- |
| 1,966,654 | Stowell | July 17, 1934 |
| 2,163,671 | Dunning | June 27, 1939 |
| 2,244,506 | Staszkiewiecz | June 3, 1941 |
| 2,284,836 | Norton et al. | June 2, 1942 |
| 2,286,346 | Clausen | June 16, 1942 |
| 2,301,616 | Conrad | Nov. 10, 1942 |
| 2,305,681 | Dunning | Dec. 22, 1942 |
| 2,340,606 | Mann | Feb. 1, 1944 |
| 2,345,148 | Proctor | Mar. 28, 1944 |
| 2,348,204 | Brubaker | May 9, 1944 |
| 2,350,682 | Hoehn et al. | June 6, 1944 |
| 2,366,458 | Proctor | Jan. 2, 1945 |
| 2,380,754 | Hardy | July 31, 1945 |
| 2,410,607 | Moore | Nov. 5, 1946 |
| 2,482,212 | Rieber | Sept. 20, 1949 |
| 2,495,480 | Rieber | Jan. 24, 1950 |